Jan. 4, 1966  P. D. ABBOTT  3,226,818
METHOD OF MAKING A BALL AND SOCKET TYPE HITCH
Filed Sept. 22, 1964
FIG.1
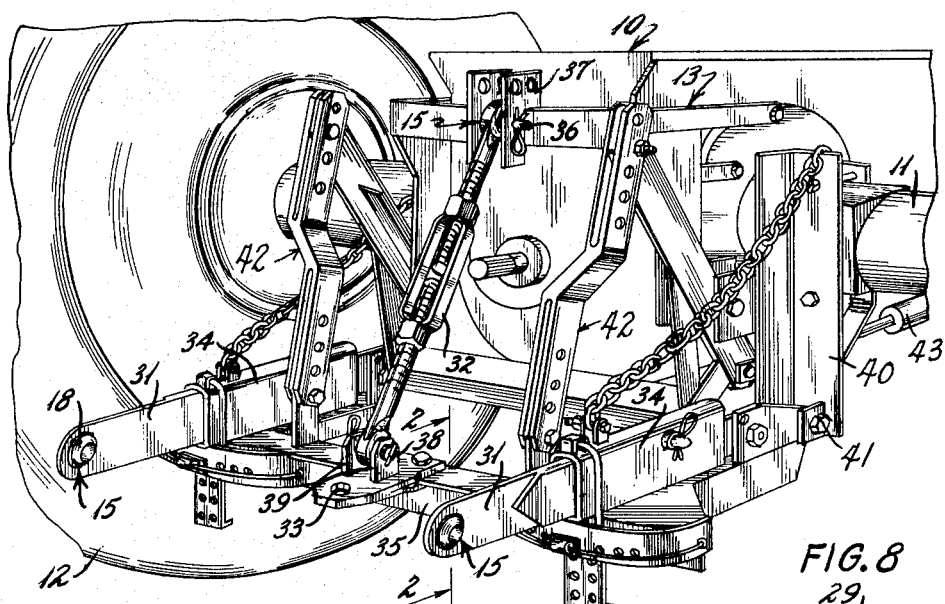
FIG.2
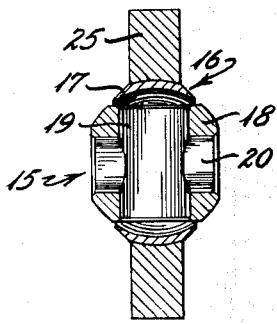
FIG.7
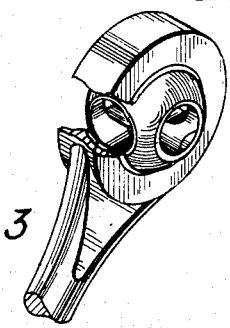
FIG.8
FIG.3
FIG.4
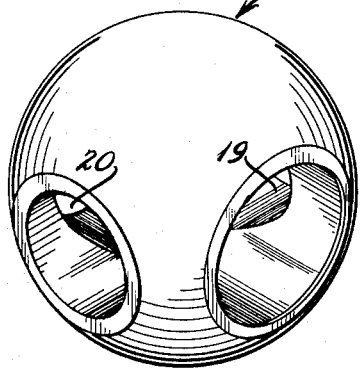
FIG.5
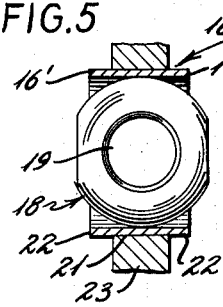
FIG.6
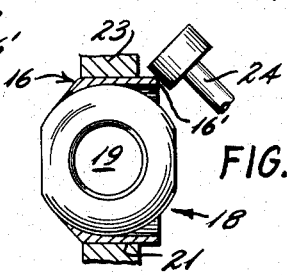
INVENTOR
PAUL D. ABBOTT
BY
ATTORNEY United States Patent Office 3,226,818
Patented Jan. 4, 1966

3,226,818
METHOD OF MAKING A BALL AND
SOCKET TYPE HITCH
Paul D. Abbott, P.O. Box 187, Blytheville, Ark.
Filed Sept. 22, 1964, Ser. No. 398,189
4 Claims. (Cl. 29—441)

This application is a continuation-in-part of my application Serial No. 240,518 filed November 28, 1962, now abandoned.

This invention relates to the cultivation of the soil and to equipment and the fabrication thereof by which the various cultivation operations may be performed in the simplest and the most practical manner as well as in connection with readily available conventional equipment.

The invention relates particularly to means for attachment of equipment or implements used for cultivation or other treatment of the earth's surface as for example by means of a 3-point hitch to a tractor and to a specific hitch and the fabrication thereof of a character to accommodate different types and sizes of equipment.

Tractor hitches have been produced which included ball and socket joints each of which was designed to accommodate a specific size and type of equipment, the ball members having coupling rings forged or cast thereabout and each ball member having a single opening for the reception of a simple coupling pin, and in order to accommodate coupling pins of different sizes it was necessary to change the size of the ball member or to furnish multiple ball members to provide one with the proper size pin receiving opening, and all of which required the expenditure of time and effort to make the desired coupling connection.

It is an object of the invention to provide a tractor hitch of ball and socket type capable of accommodating and being selectively used with multiple pins of different sizes by the provision of multiple angularly disposed openings in the ball member thus reducing the total number of hitches required.

Another object of the invention is to provide a time saving tractor hitch of a ball and socket type similar to that ordinarily used but modified to receive coupling pins of multiple sizes, thereby obviating the necessity of changing the ball and socket but requiring the mere rotation of the ball member with the coupling pin receiving openings of different sizes.

A further object of the invention is to provide a method of forming a race or coupling ring about a ball having multiple diametrically opposed openings in a manner to permit the ball to be freely rotatable.

A still further object of the invention is to provide a method of forming a race or coupling ring socket about a ball in which the ball has at least one opening extending entirely therethrough and disposed within such race or socket.

Other objects and advantages of the invention will be apparent from the following description taken in conjunction with the accompanying drawing wherein:

FIG. 1 is a perspective illustrating one application of the invention;

FIG. 2, a detailed section on the lines 2—2 of FIG. 1;

FIG. 3, an enlarged fragmentary perspective of one end of a turnbuckle connection;

FIG. 4, an enlarged perspective of a ball having diametricall opposed openings;

FIG. 5, a vertical section illustrating the first step in applying the race to the ball;

FIG. 6, a vertical section illustrating a subsequent step in the forming process of FIG. 5;

FIG. 7, a vertical section similar to FIG. 5 of a modified method of forming the race on the ball; and FIG. 8, a vertical section illustrating a subsequent step in the forming process of FIG. 7.

The present invention involves the connection of multiple implements to a conventional tractor including, for example, by means of a 3-point hitch, each hitch including a coupling ring with edges spun over and overlying a rotating ball member having angularly disposed openings therethrough of multiple sizes for receiving coupling pins of different implements of different sizes in order to accommodate multiple vehicles of various kinds.

Briefly stated the present invention is directed to the method of making a ball and socket type hitch in which the ball member has a plurality of angularly disposed pin receiving openings of different sizes and is mounted in a supporting raceway or ring with free edges spun over and overlying the ball member for free rotation, such ball member being adapted to receive coupling pins of different sizes mounted on implements of varying sizes.

With continued reference to the drawing a conventional tractor 10 is provided having a rear axle housing 11, ground engaging wheels 12 and a fluid pressure system. An attachment 13 is provided and is mounted on the tractor 10 as illustrated and described in U.S. Patent No. 3,031,208 and such attachment is adapted to accommodate various implements or equipment having 1, 2 or 3 point hitch connections.

The present invention is a method of making a ball and socket type hitch connection. The hitch includes a selective coupling hitch 15 which may be attached to the mounting elements of the attachment 13 and is provided with means for selectively attaching implements having coupling pins of varying sizes. The hitch comprises a coupling ring or socket 16 having an internal annular concavity or race 17 in which an inner member or ball 18 having a cooperating convex peripheral surface is rotatably mounted. In order to provide adjustment and to accommodate equipment having connecting pins of varying sizes, the ball 18 has a relatively large opening 19 extending diametrically therethrough in one direction and a smaller opening 20 extending therethrough in a direction normal to the axis of the large opening 19. If desired additional openings may be provided through the ball at different angles to accommodate connecting pins of different sizes.

Since the ball 18 has a plurality of openings extending therethrough and at least some of such openings will be in alignment with the coupling ring 16 when the ring is formed about the ball, it is not feasible to forge, cast or swage the ring about the ball in the conventional manner. In order to form the coupling ring about the ball 18 so that such ball is freely rotatable, the coupling ring 16 initially is in the form of a cylindrical sleeve 21 (FIG. 5) having free ends 22. A pair of jaws 23 clamp the central portion of the sleeve 21 after which the ball 18 is inserted into the sleeve and retained therein by any desired means. A spinning tool 24 (FIG. 6) is then applied to one of the ends 22 at a predetermined angle and rotated about the sleeve to cause the end of the sleeve to be contracted into close proximity with the periphery of the ball or sphere. The operation is then repeated with the opposite end of the sleeve 21 to complete the coupling ring. If desired, both ends of the sleeve 21 may be spun simultaneously to complete the ring in one operation.

With reference to FIGS. 7 and 8, a modified method of forming the race is provided which includes a generally cylindrical sleeve 25 having tapered ends 26. As illustrated in FIG. 7, the sleeve 25 preferably is subjected to heat after which a plug 27 with a semi-spherical end 28 of substantially the same diameter as the inner diameter of the sleeve 25 is inserted a predetermined distance into the sleeve. A crimping tool 29 having a recess 30 of a desired configuration is then moved into engagement with one end of the sleeve 25 to deform such sleeve about the semi-spherical end 28. Thereafter, a ball 18 is placed within the sleeve and the crimping tool 29 is applied to the opposite end of such sleeve. The tool 29 deforms the sleeve 25 into contact with the ball 18 and when the tool is removed, the inherent resiliency or spring back of the sleeve will provide a clearance to permit the ball to rotate freely.

Thereafter, the coupling ring 16 is welded or otherwise mounted in one end of a relatively thin tongue or mounting element 31 with one of such mounting elements being located at each side of the tractor and adapted to accommodate an implement having a conventional two-point or fast hitch connection. A third connecting member in the form of a turnbuckle or other adjustable connecting member 32 or the like is provided which functions as the upper connection of a 3-point hitch or as a support for a 1-point hitch connection 33. The mounting elements 31 are removably mounted in sleeves 34 carried on opposite sides of a draw bar 35 and the 1-point hitch connection 33 is located centrally of such draw bar. One end of the turnbuckle 32 is connected by a pin 36 to a pair of brackets 37 fixed to the attachment 13 and when the turnbuckle is not in use as the third point of a 3-point connection, the opposite end is connected by a pin 38 to a pair of brackets 39 carried by the 1-point hitch connection 33.

In order to mount the attachment 13 on the tractor 10, a mounting bracket 40 is fixed to the axle housing 11 at each side of the tractor. The draw bar 35 is connected to each of the brackets 40 by pivot pins 41. A lift mechanism 42 is pivotally connected to the outer end of the draw bar and such lift mechanism may be operated in any desired manner, as by fluid cylinders 43, to raise and lower such draw bar and to maintain the same in any adjusted position.

In the use of the device the tractor is moved to a position for engagement with an implement having a 1, 2 or 3-point hitch connection and the ball 18 is rotated within the coupling ring 16 so that the appropriate opening is disposed generally axially of the coupling ring. The connecting pin of the implement is then inserted through the brackets of the implement and through the opening of the ball to attach the implement to the tractor. When it is desired to attach an implement having a connecting pin of a different size it is necessary only to rotate the ball so that a corresponding opening is disposed axially of the coupling ring.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. The method of manufacturing a ball and socket type hitch comprising the steps of providing a ball, drilling a pair of diametrically opposed openings entirely through said ball, providing a cylindrical coupling ring sleeve having an internal diameter slightly greater than the diameter of said ball; clamping the central portion of said coupling ring sleeve with a pair of jaws, inserting said drilled ball into the coupling ring sleeve, contracting both ends of said coupling ring sleeve about and in close proximity to said ball, and thereafter welding the coupling ring sleeve assembly in an opening in a mounting element of a hitch, whereby said ball will be freely rotatable within said sleeve assembly.

2. The method of claim 1 in which the ends of said coupling ring sleeve are contracted by spinning.

3. The method of claim 1 in which the ends of said coupling ring sleeve are contracted by crimping.

4. The method of claim 1 in which the drilled openings are of different diameters.

References Cited by the Examiner

UNITED STATES PATENTS

| | | | |
|---|---|---|---|
| 1,469,688 | 10/1923 | Pitkin | 287—87 X |
| 1,586,788 | 6/1926 | Dunham | 287—87 X |
| 2,462,138 | 2/1949 | Spangenberg | 29—149.5 |
| 2,618,049 | 11/1952 | Flumerfelt | 29—441 |
| 2,715,766 | 8/1955 | Ricks | 29—441 |
| 2,804,679 | 9/1957 | Tracy | 29—149.5 |
| 3,031,208 | 4/1962 | Abbott | 29—149.5 |
| 3,066,952 | 12/1962 | Price | 280—415 |
| 3,068,551 | 12/1962 | Cobb | 29—149.5 |
| 3,099,082 | 7/1963 | Henriksen | 29—441 X |
| 3,151,882 | 10/1964 | Foxwell et al. | 280—415 |

FOREIGN PATENTS 1,107,986   5/1961   Germany.

WHITMORE A. WILTZ, *Primary Examiner.*

THOMAS H. EAGER, *Examiner.*